United States Patent [19]

Schwaller et al.

[11] Patent Number: 4,732,532
[45] Date of Patent: Mar. 22, 1988

[54] ARRANGEMENT FOR MINIMIZING BUZZ SAW NOISE IN BLADED ROTORS

[75] Inventors: Peter J. G. Schwaller, Horsley Woodhouse; David R. Newby, Allestree, both of England

[73] Assignee: Rolls-Royce plc, London, England

[21] Appl. No.: 441,152

[22] Filed: Nov. 12, 1982

Related U.S. Application Data

[63] Continuation of Ser. No. 150,673, May 16, 1980, abandoned.

[30] Foreign Application Priority Data

Jun. 16, 1979 [GB] United Kingdom ............... 7921022

[51] Int. Cl.⁴ .................................. F04D 29/66
[52] U.S. Cl. .......................... 415/119; 416/223 R; 416/500
[58] Field of Search ............. 415/119, 181, DIG. 3, 415/DIG. 5; 416/203, 223 A, 500; 29/156.8 B; 73/116

[56] References Cited

U.S. PATENT DOCUMENTS

| | | | |
|---|---|---|---|
| 3,006,603 | 10/1961 | Caruso et al. | 415/119 |
| 3,058,528 | 10/1962 | Hiersch | 415/203 |
| 3,169,694 | 2/1965 | Borchers . | |
| 3,270,953 | 9/1966 | Jerie et al. | 415/119 |
| 3,465,524 | 9/1969 | Wilde et al. . | |
| 3,531,167 | 9/1970 | Edge et al. . | |
| 3,536,417 | 10/1970 | Stiefel et al. | 416/203 |
| 3,820,918 | 6/1974 | Goldstein | 415/119 |
| 3,888,601 | 6/1975 | Glassburn | 416/500 |
| 4,213,736 | 7/1980 | Gongwer . | |
| 4,253,800 | 3/1981 | Segawa | 415/119 |

FOREIGN PATENT DOCUMENTS 981188 1/1965 United Kingdom .
1177665 1/1970 United Kingdom .

OTHER PUBLICATIONS

SAE Journal, Jan. 1962, pp. 54–60, "Stop Compressor Noise Before It Starts", based on a paper by Tyler & Sofrin (Pratt & Whitney Aircraft).
J. M. Diehl, "Think Quiet" from *Compressed Air*, copyright 1971.
M. L. Adams, "Keep Rotor Vibration under Control" from *Power*, Aug. 1978, pp. 28, 29 & 65.
"Multiple Pure Tone Noise Generated by Fans at Supersonic Tip Speeds"–Sofrin and Pickett.
"Air Transport–British Upgrade Mideast Service", Aviation Week & Space Technology, May 21, 1979, pp. 24–27.

*Primary Examiner*—Samuel Scott
*Assistant Examiner*—Allen J. Flanigan
*Attorney, Agent, or Firm*—Cushman, Darby & Cushman

[57] ABSTRACT

The invention minimizes selected tones present in buzz-saw noise, otherwise known as multiple pure tone noise. This noise arises from the production of unequal shockwaves during the rotation at sonic or supersonic velocities of a bladed rotor, the dimensional characteristics of whose blades are subject to manufacturing tolerances. Minimization of selected buzz-saw noise tones is achieved by arranging the blades around the rotor in a sequence which minimizes selected Fourier coefficients of the shockwave strengths; alternatively, the blades are arranged to minimize selected Fourier coefficients of the dimensional characteristics of the blades, such as thickness, t, stagger angle $\theta$, and camber. The invention is particularly applicable to the fan propulsors of turbofan aeroengines.

4 Claims, 2 Drawing Figures

ARRANGEMENT FOR MINIMIZING BUZZ SAW NOISE IN BLADED ROTORS

This is a continuation of application Ser. No. 150,673, filed May 16, 1980, now abandoned.

This invention relates to techniques for minimising "buzz-saw" noise arising from the rotation of a bladed rotor within a duct at sonic or supersonic velocities. In particular it relates to ways of minimising "buzz-saw" noise (otherwise known as multiple pure tone noise) in turbofan aeroengines.

The fan propulsor blades of some modern turbofan aeroengines attain sonic or supersonic velocities under certain operational conditions of the engines and it is found as a result that a prominent and irritating part of the noise produced consists of "buzz-saw" noise, so called because of its resemblance to the noise a circular saw makes when cutting wood.

At positions very close to the fan blades, the noise due to the shock waves is at substantially a single frequency, which is the frequency with which the blades pass any particular fixed points as they rotate. This frequency is called "blade passing frequency". A main cause of buzz-saw noise is found in the fact that, due to manufacturing tolerances, the dimensional characteristics of the blades vary slightly from blade to blade. As a result there are variations from blade to blade in the amplitude (strength) and spacing of the shockwaves coming off those portions of the blades which have sonic or supersonic velocities. Shock waves of different strengths propagate at different speeds and therefore as the shock waves travel away from the blades, the noise at blade passing frequency degenerates into a broad spectrum of lower frequency tones because the shock waves overtake and merge with each other.

One way of eliminating buzz-saw noise would be to ensure that all fan blades are manufactured within such tight dimensional tolerances that the shock waves they produce are substantially identical. However, this approach is impractical because it would be extremely costly and probably impossible to achieve with currently available manufacturing techniques.

Another way of combating buzz-saw noise is to utilise special-purpose acoustic linings in the intake duct of the fan, but this expedient adds weight and manufacturing expense to the engine.

The present invention provides a third way of combating buzz-saw noise which utilises the differences in dimensional characteristics between blades to reduce buzz-saw noise whilst avoiding substantial weight and cost penalties.

According to the present invention a bladed rotor is adapted for rotation within a duct under conditions in which at least the radially outer portions of the blades attain sonic or supersonic velocity and the blades generate shock waves of unequal strengths, the blades being arranged around the rotor in a sequence which minimises at least one selected Fourier coefficient of the shockwave strengths, thereby to minimise at least one buzz-saw noise tone corresponding to said at least one selected Fourier coefficient.

Also according to the invention a bladed rotor for an axial fluid-flow rotary machine is adapted for use under conditions where at least the radially outer portions of the blades attain sonic or supersonic velocity within a duct of said machine, the blades being arranged around the rotor in a sequence which minimises at least one selected Fourier coefficient of at least one blade dimensional characteristic, thereby to minimise at least one buzz-saw noise tone corresponding to said at least one selected Fourier coefficient.

The selected dimensional characteristics may advantageously be blade thickness (particularly leading edge thickness) and/or blade stagger angle and/or blade camber.

The invention also embraces methods of minimising at least one selected buzz-saw noise tone as described and claimed hereafter.

Other aspects of the invention will be apparent from the following description and claims.

Details of the invention will now be further explained by way of example only and with reference to the accompanying drawings, in which.

Figure 1:
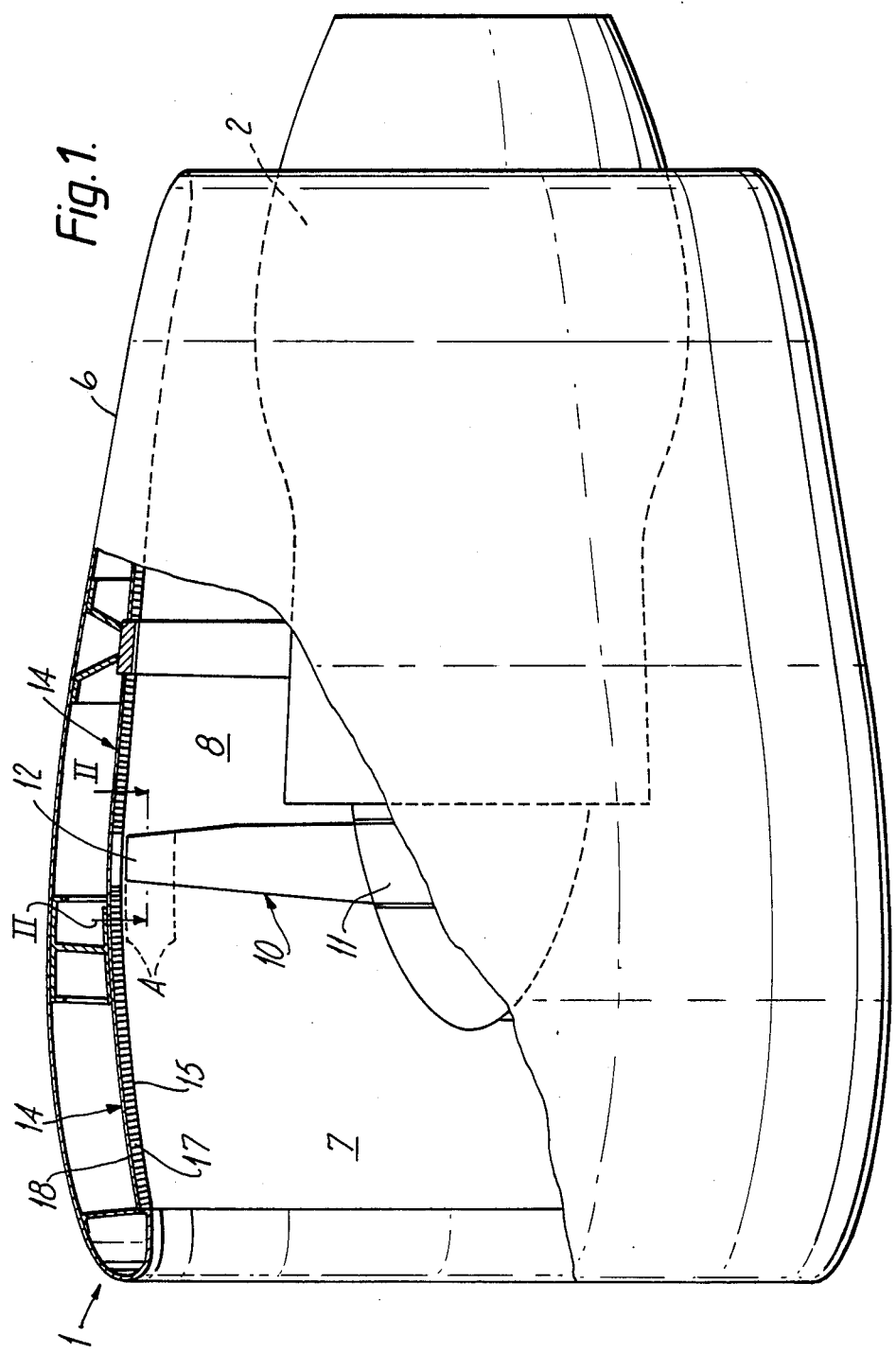
FIG. 1 is a generalised part-sectional elevation of a high by-pass ratio turbofan aeroengine, in which the invention can be put into effect.

Referring now to FIG. 1, a high by-pass ratio turbofan aeroengine 1 has a core engine 2 and a fan casing 6 defining air intake 7 and by-pass duct 8. Fan casing 6 is shown partially "broken away" to reveal a bladed rotor in the form of a front fan propulsor 10, which consists of a set of aerofoil shaped fan blades 12 attached to a hub member 11. Apart from manufacturing tolerances, the blades 12 are identical to each other. They are arrayed around the hub in equi-angularly spaced relationship to each other, though of course this equi-angular spacing is also subject to the effect of manufacturing tolerances.

The fan casing 6 is provided with acoustic linings 14 for absorption of noise within the intake 7 and by-pass duct 8. These acoustic linings are of the "honeycomb sandwich" type, comprising a sound permeable facing layer 15, a honeycomb cellular core layer 17 and an impervious backing layer 18.

During operation of the engine 1, for example during takeoff and at other times when its power output is at a maximum, the fan 10 rotates so fast that a radially outer zone A of each fan blade 12 attains supersonic velocity. As a result, the supersonically rotating portions of the blades produce shockwaves, which can be heard as noise. As already discussed, at positions very close to the fan blades the noise is at blade passing frequency, but the existence of the slight but unavoidable variations in the dimensional characteristics of the blades in the set, and in inter-blade spacing around hub 11, causes buzz-saw noise to arise in the intake 7 upstream of the fan blades 12 and in the by-pass duct 8 downstream of the blades.

The buzz-saw noise is spread over a broad tonal range, from blade passing frequency down to the hub rotational frequency. Since all these frequencies arise from shockwaves generated by individual blades, the buzz-saw tones present in the intake 7 and by-pass duct 8 are in fact predominantly whole number multiples of hub rotational frequency, the maximum multiplication factor (otherwise called the "order" of the tone) being the number of fan blades in the complete set of blades.

The acoustic linings 14 are designed to absorb noise at blade passing frequency most efficiently, and do not attenuate the buzz-saw noise very effectively, especially the lower frequencies. Although it is possible to replace some of the acoustic linings 14 with other types of acoustic lining which are more effective in absorbing a broad range of frequencies, the resulting weight and cost penalties make it worthwhile to adopt the present invention in order to combat buzz-saw noise.

Figure 2:
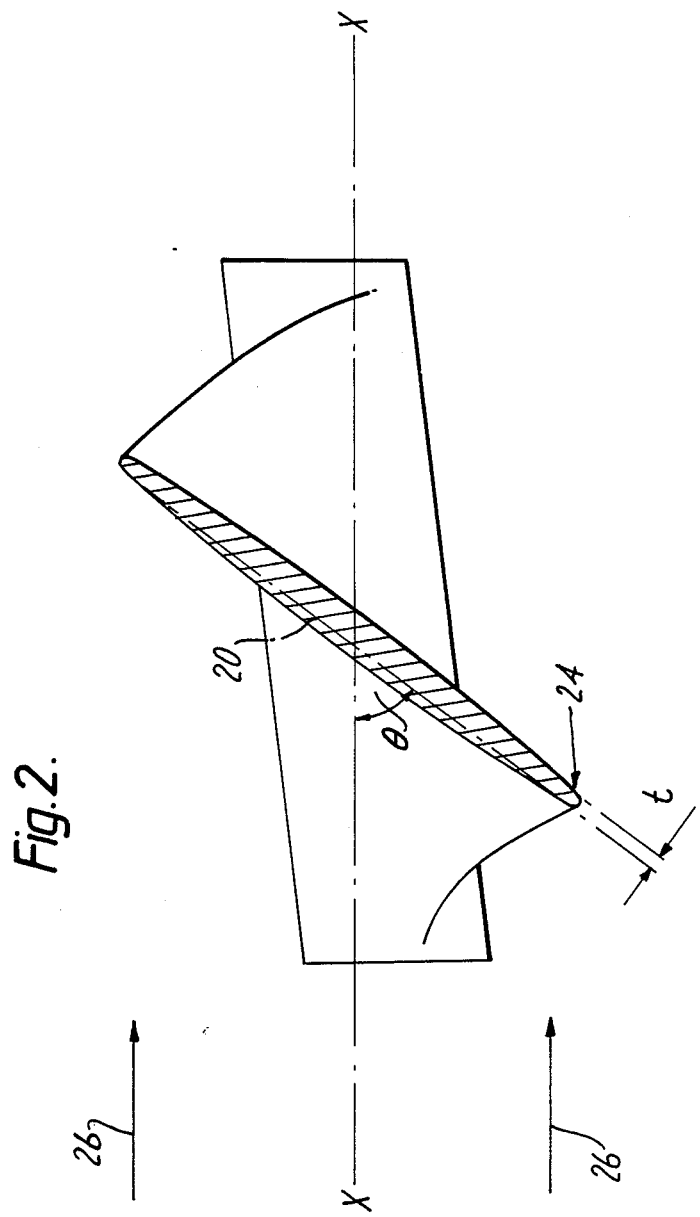
FIG. 2 is a diagrammatic cross-section of one of the fan blades in the engine of FIG. 1, taken on section line II—II in FIG. 1.

Referring now to FIG. 2, information relating to certain dimensional characteristics of the fan blades 12 is shown. The cross-section chosen is in that part of the blade, near the radially outer tip, which experiences sonic or supersonic velocities (zone A in FIG. 1).

The angle $\theta$ is the blade stagger angle at the particular section of the blade shown, and is the angle included between the true chord 20 at that section and the rotational axis X—X of the fan: t represents the leading edge thickness of the section and is taken to be the thickness at a location 24, which is a location on the blade flanks considered to be representative of the blade thickness as "seen" by the air stream 26 upon which the blade works.

Although the various factors which contribute to the production of buzz-saw noise may have different relative importances in different designs of bladed rotors, theoretical and empirical investigations of one particular type of bladed rotor, namely the axial flow fan propulsor of the RB.211 (Registered Trade Mark) turbofan aeroengine, manufactured by the present assignee, has shown that the two most important factors in this engine are variations in the stagger angle $\theta$ of the fan blades and variations in the thickness of the fan blades, particularly variations in leading edge thickness, t. These two factors together have been observed to account for over 70% of the shock wave strength variation.

Other factors which are thought to contribute to variations in shock wave strength are: variations in inter-blade spacing, and variations in blade camber in zone A (the camber of a blade is the degree of curvature of the centreline of the aerofoil, relative to the chord line).

Although the invention will be described with particular reference to the important factors $\theta$ and t, the invention is not limited to manipulation of only $\theta$ and t. Other factors already mentioned may also be taken into account, using similar methods of analysis and computation.

The effect of variations in $\theta$ and t on shockwave strength will first be described in greater detail.

In practice it is found that the strength of a shockwave at a blade is dependent not only upon the blade producing the shockwave, but also upon the immediately preceding blade. For instance, if a blade has a larger stagger angle than its two neighbours, the shock wave at that blade is found to be less strong than the average of the shockwave strength at all the blades, but the shockwave at the succeeding blade is found to be of greater strength than the average. This is due to the effect of the different stagger angle on the capacities of the passages between the blades. Similarly, if a blade has a smaller stagger angle than its two neighbours, the shockwave at that blade is found to be stronger than average, but the shockwave at the succeeding blade is weaker than average.

If a blade has a greater thickness than its two neighbours the shockwaves both at that blade and the succeeding blade are found to be greater than average; similarly, a thin blade produces two weaker shockwaves.

An empirical formula can be developed to predict the shockwave strength, S, associated with a particular blade on the basis of variations in $\theta$ and t only. Considering the rth blade, $$S_r = -m_1(\theta_r - \theta_{r-1}) + m_2(t'_r + t'_{r-1}) + \overline{S} \quad \text{(i)}$$

where $\overline{S}$ is the average shock strength, $m$ and $m_2$ are constants, and $t'$ is the amount by which a given blade deviates from the mean thickness of all the blades.

For the RB.211 engine, $m_1 \sim 2$ and $m_2 \sim 0.6$. From this it can be shown that approximately 60% of the total variation in shock strength is due to variations in $\theta$, but only about 10% of the total variation in shock strength is due to variations in t. However, variations in $\theta$ have most effect on buzz-saw noise tones at about one half of blade passing frequency, whilst variations in t have most effect on tones at low orders of hub rotational frequency and negligible effect on the middle and high order tones. Blade thickness variations therefore contribute at least as much as stagger angle variations to the production of buzz-saw noise at low orders of hub rotational frequencies. Since low frequency noise is the most difficult to combat using known methods of noise attenuation, it will be seen that the present invention can make a useful contribution in this connection especially.

Two alternative methods of analysing the effect of variations in $\theta$ and t on buzz-saw noise will now be described.

METHOD 1

This methods involves calcuation of the combined effect on buzz-saw noise of variations in $\theta$ and t.

For any particular set of fan blades, the shockwave strengths resulting from any particular chosen sequence of the blades around the fan hub can be predicted (taking account of $\theta$ and t only) from the above equation (i), the equation being used to evaluate the shockwave strength at each blade individually. Because it is empirical, this equation automatically takes into account any phase difference which may exist between the component of shock-wave strength due to $\theta$ and the component due to t, i.e. the equation gives the resultant of the two components.

The shockwave strengths for any such chosen sequence of blades can be thus predicted, and a prediction of the resulting buzz-saw noise can also be made using the well-known principles of Fourier analysis, since the intensity of, say, the nth order buzz-saw noise tone is proportional to the nth Fourier coefficient of the set of shockwave strengths resulting from the chosen blade sequence. The nth Fourier coefficient of shockwave strength S is given by the equation $$FS_n = \frac{2}{N}(Sa_n^2 + Sb_n^2)^{\frac{1}{2}} \quad \text{(ii)}$$

where, N is the number of blades in the set, $$Sa_n = \sum_{k=1}^{N} S_k \sin\left(\frac{2\pi nk}{N}\right), \quad \text{(iii)}$$

and $$Sb_n = \sum_{k=1}^{N} S_k \cos\left(\frac{2\pi nk}{N}\right). \quad \text{(iv)}$$

Supposing, therefore, that it is desired to minimise the buzz-saw noise tone corresponding to the nth order of hub rotational frequency; an iterative computer programme can be devised in which equations (i) to (iv) above are utilised to determine which sequence of blades around the hub, out of all possible sequences, produces the least value of $FS_n$.

Such a programme would of course be run for each set of blades to be assembled into a fan, and each set of blades would be fitted to their hub in the sequence dictated by the results.

METHOD 2

This method of analysis involves calcuation of the separate effects on buzz-saw noise of variations in $\theta$ and t respectively.

It can be shown by the properties of Fourier coefficients that the Fourier coefficients of a set of stagger angles are proportional to the Fourier coefficients of the corresponding set of blade-to-blade variations in stagger angle. Thus, for the nth coefficient, $$F\theta \alpha F\Delta\theta_n, \text{ where} \tag{v}$$

$$F\Delta\theta_n = \frac{2}{N} (\Delta\theta a_n^2 + \Delta\theta b_n^2)^{\frac{1}{2}}, \tag{vi}$$

$$\Delta\theta a_n = \sum_{k=1}^{N} (\theta_k - \theta_{k-1}) \sin\left(\frac{2\pi n k}{N}\right), \tag{vii}$$

$$\theta b_n = \sum_{k=1}^{N} (\theta_k - \theta_{k-1}) \cos\left(\frac{2\pi n k}{N}\right), \tag{viii}$$

and N is the number of blades in a set, as before.

It can also be shown that the Fourier coefficients of a set of blade thicknesses are proportional to the Fourier coefficients of a corresponding set in which each blade thickness is summed with the preceding one, i.e.

$$Ft_n \alpha F\Box t_n, \text{ where} \tag{ix}$$

$$F\Box t_n = \frac{2}{N} (\Box t a_n^2 + \Box t b_n^2)^{\frac{1}{2}}, \tag{x}$$

$$\Box t a_n = \sum_{k=1}^{N} (t_k + t_{k-1}) \sin\left(\frac{2\pi n k}{N}\right), \tag{xi}$$

and $$\Box t b_n = \sum_{k=1}^{N} (t_k + t_{k-1}) \cos\left(\frac{2\pi n k}{N}\right). \tag{xii}$$

To minimise the buzz-saw noise tone corresponding to that nth order of hub rotational frequency, it is necessary to arrange the blades of any particular set in a sequence around the hub which ensures that both the nth Fourier coefficient of $\theta$ and the nth Fourier coefficient of t are separately minimised. Rearrangement of the blades in this way to reduce $F\theta_n$ and $Ft_n$ in equations (v) and (ix) will inevitably reduce $FS_n$, since by equation (i) the shock wave strengths are proportional to $(\theta_k - \theta_{k-1}) + (t_k + t_{k-1})$. Therefore equations (v) to (xii) are used in an iterative computer programme devised to produce a blade sequence which minimises $F\theta_n$ and $Ft_n$. Note that in this method the actual values of shockwave strengths are not considered and no account is taken of possible phase differences between the components of shock wave strength due to $\theta$ and t respectively.

The progress of a set of blades through an exemplary procedure aimed at achieving the objects of the invention by applying either Method 1 or Method 2 will now be considered.

Firstly, each blade is identified by a distinctive number and $\theta$ and t are measured for each blade in the set. The section at which the measurements are made is chosen to be a good representation of the mean dimensional characteristics of that part of the blade which experiences sonic or supersonic velocities.

When $\theta$ and t have been measured—together with any other parameters which it is desired to take into account during assembly of the fan, including the weight of each blade—each blade's measurements are utilised in an iterative computer programme by means of which the best arrangement of the blades (i.e. the best sequence order of the blades around the hub) is worked out according to the following general principles.

(i) A constraint is written into the programme which ensures that any blade arrangement chosen does not produce a moment weight unbalance for the complete fan of more than a certain amount. This is necessary because manufacturing tolerances inevitably lead to slight variations in weight of the blades; the best arrangement of blades from the point of view of buzz-saw noise reduction is not necessarily the best from the point of view of fan balance.

(ii) Since it is desirable to reduce the average intensities of as many buzz-saw noise tones as possible, the computer programme can, if required, constrain the computer to work out an arrangement of the blades in which variations in the strength of the shockwaves between each blade and its immediate neighbours are kept within predetermined limits. By equation (i), this can be done by minimisation of the blade-to-blade differences in $\theta$ and/or t (minimisation of $\Delta\theta$ and/or $\Delta t$). For example, if the programme specifies that variations in $\theta$ between neighbouring blades are to be kept within a certain limit, this constraint has the consequence that the blades are arranged around the hub in ascending and descending order of $\theta$ values; the value of the first Fourier coefficient of $\theta$ is thus inevitably increased, but the average value of all the other coefficients is decreased, i.e. the buzz-saw noise tone at hub rotational frequency is *increased* in intensity but the other buzz-saw noise tones are, on average, *decreased* in intensity.

It is important to note that the desirability of decreasing the intensity of many buzz-saw noise tones by minimising $\Delta\theta$ and/or $\Delta t$ must be weighed against the possible effect on fan aerodynamic balance of concentrating blades with larger stagger angle and/or thickness on one side of the hub and those with smaller stagger angles and/or thickness on the other side. In fact, in order to improve the aerodynamic balance of some fans it may be desirable to have a programme which minimises the first Fourier coefficients of $\theta$ and/or t instead of minimising blade-to-blade variations in $\theta$ and/or t.

(iii) Within the limits imposed by (i) and (ii) above, the programme causes the computer, by a process of "trial and error", to ascertain which arrangement of the blades will best minimise either those Fourier coefficients of shock wave strength (METHOD 1) or those Fourier coefficients of $\theta$ and t (METHOD 2) which correspond to the most troublesome buzz-saw noise tones. Because high frequency noise has a higher natural rate of attenuation than low frequency noise, one is likely to find that the low order buzz-saw noise tones are the most troublesome.

Suppose now that it is decided, according to the above principles, that the set of blades under consideration should be arranged around the fan hub so as to minimise fan weight unbalance, the overall level of buzz-saw noise, and the two buzz-saw noise tones corresponding to the nth and (n+1)th orders of hub rotational frequency. The iterative computer programme required to achieve this arrangement should therefore minimise the first Fourier coefficient of blade moment weights, variations in $\theta$, and (according to METHOD 2) the nth and (n+1)th Fourier coefficients of $\theta$ and t. According to the programme the first Fourier coefficient of blade moment weights, $FW_1$, which is proportional to the moment weight unbalance, must be not greater than a certain acceptable maximum value;

any blade (say the rth blade) must differ from its two adjacent blades with respect to $\theta$ by not more than a certain amount $\Delta\theta$, i.e.

$$|\theta_r - \theta_{r-1}| \text{ and } |\theta_r - \theta_{r+1}| > \Delta\theta;$$

and

"unified index", u, of the relevant Fourier coefficients is minimised, where $$u^2 = [(aFW_1)^2 + (bF\theta_n)^2 + (cF\theta_{n+1})^2 + (dFt_n)^2 + (eFt_{n+1})^2]^{\frac{1}{2}}$$

and $FW_1$ is the first Fourier coefficient of blade moment weights, $F\theta_n$ and $F\theta_{n+1}$ are the nth and (n+1)th Fourier coefficients of blade stagger angles, $Ft_n$ and $Ft_{n+1}$ are the nth and (n+1)th Fourier coefficients of blade thicknesses, and a,b,c,d and e are constants.

When the blade sequence which best fulfills these requirements has been computed, the computer prints out the sequence and the set of blades is fixed onto the fan hub in that sequence.

It should be noted that the methods outlined above use only one $\theta$ measurement and one t measurement per blade. However, it is probable that buzz-saw noise is dependent upon variations in $\theta$ and t all along the radial extent of the sonically and supersonically rotating portions of the blades. A more refined programme could therefore be devised in which "effective" values of $\theta$ and "effective" values of t would be utilised for each blade. The "effective" value of $\theta$ or t for a blade would be an average value of $\theta$ or t for a number of radial locations within the supersonic portion, the average being "weighted" towards $\theta$ or t values in the radially outermost portion of the blade, where the velocity (and hence the shockwave strength) is greatest.

One problem in measuring $\theta$ is the effect of centrifugal forces on stagger angle when the blades are rotating; these forces tend to "untwist" the blades and thereby cause the stagger angles to be less during operation of the fan than they are when the blades are stationary. Care must therefore be taken that due allowance is made for the effect of rotational forces on stagger angles. The task is considerably eased if the fan is of the type in which untwisting and vibration of the blades is limited by the provision of "clappers"—these are metallic protrusions of complementary shape which are provided on both flanks of the fan blades at a location which is nearer to the blade tips than it is to the point of attachment of the fan blade to the hub. When the fan is assembled, adjacent clappers do not quite contact each other, but when the fan rotates at more than a certain predetermined speed, the clappers are urged into engagement with each other by the untwisting of the blades, and effectively prevent further untwisting.

Although for the above programme, t is measured close to the leading edge of the blade, it seems possible that the blade thickness in the mid-chord region of the blade also has an influence on buzz-saw noise, and again, this factor could be taken into account.

A further factor which could be taken into account if desired is the interblade spacing, which affects the shockwave spacing and may also affect shock-wave amplitude.

Yet another factor which could have an effect on buzz-saw noise production is the possibility that during aircraft cruise conditions (as opposed to take-off and landing conditions) the capacities of the blade passages may change somewhat, thereby changing the shockwave strength prediction equation (i) and hence the relative contributions to buzz-saw noise of variations in $\theta$ and t, $\theta$ becoming less important. However, since equation (i) is purely empirical, this is easily allowed for by using appropriate constants.

We claim:

1. A rotor including a plurality of rotor blades, said rotor being adapted for rotation within a duct under conditions in which at least radially outer portions of said rotor blades attain at least sonic velocity thereby producing shockwaves within said duct, said blades being subject to manufacturing tolerances manifested in blade-to-blade variations of at least one selected dimensional characteristic of said blades, which dimensional characteristic has a significant effect on shockwave strengths, whereby said blades generate shockwaves which vary in strength from blade to blade around said rotor thereby causing buzz saw noise within said duct, said rotor being produced by a process in which the blades are arranged in a sequence which minimizes the intensity of at least one selected buzz saw noise tone, said process comprising the steps of:
    (a) measuring said at least one selected dimensional characteristic of each blade to be assembled into said rotor;
    (b) notionally arranging said blades around said rotor in a chosen sequence;
    (c) evaluating the shockwave strength at each said blade as arranged in sequence;
    (d) calculating at least one Fourier coefficient of said shockwave strengths for said sequence, said at least one Fourier coefficient being selected to correspond to said at least one selected buzz saw noise tone;
    (e) rearranging said blades around said rotor in further sequences and repeating steps (c) and (d) for each such sequence to determine which one of said sequences produces an acceptable minimum value of said at least one Fourier coefficient; and
    (f) assembling said blades into said rotor such that they are arranged in that one of said sequences for which said minimum value of said at least one Fourier coefficient is obtained.

2. A rotor according to claim 1 wherein its process steps of production further include the step of:
    arranging the blades with respect to each other such that differences between the stagger angles of neighboring blades are not more than a predetermined value, thereby minimizing buzz saw noise tones at frequencies other than rotor rotational frequency.

3. A rotor according to claim 1 wherein its process steps of production further include the step of:
arranging the blades with respect to each other such that the moment weight imbalance of the rotor is not more than a predetermined value.

4. A rotor according to claim 1 wherein said rotor is the fan of a turbofan aeroengine.

* * * * *